United States Patent [19]
Köhler et al.

[11] Patent Number: 5,149,728
[45] Date of Patent: Sep. 22, 1992

[54] BLENDS OF POLYARYLENE SULFIDES, PHENOLIC RESIN NITROARYLATES, GLASS FIBERS AND OPTIONALLY OTHER FILLERS

[75] Inventors: Burkhard Köhler; Hans-Detlef Heinz, both of Krefeld; Klaus Reinking, Wermelskirchen, all of Fed. Rep. of Germany

[73] Assignee: Bayer Aktiengesellschaft, Leverkusen-Bayerwerk, Fed. Rep. of Germany

[21] Appl. No.: 740,114

[22] Filed: Aug. 5, 1991

[30] Foreign Application Priority Data

Aug. 15, 1990 [DE] Fed. Rep. of Germany ........ 4025782

[51] Int. Cl.$^5$ ................................................ C08K 5/32
[52] U.S. Cl. .................................... 524/259; 524/260; 524/494; 525/500
[58] Field of Search ........................ 524/259, 260, 494; 525/500

[56] References Cited

U.S. PATENT DOCUMENTS

| | | | |
|---|---|---|---|
| 4,370,292 | 1/1983 | Yanase et al. | 525/534 |
| 4,996,256 | 2/1991 | Heinz et al. | 524/259 |
| 5,071,905 | 12/1991 | Köhler et al. | 524/494 |
| 5,086,128 | 2/1992 | Heinz et al. | 524/259 |
| 5,093,397 | 3/1992 | Köhler et al. | 524/259 |

Primary Examiner—Kriellion S. Morgan
Assistant Examiner—Tae H. Yoon
Attorney, Agent, or Firm—Connolly & Hutz

[57] ABSTRACT

The invention relates to blends of polyarylene sulfides, phenolic resin nitroarylates, glass fibers and optionally other fillers (additives). The blends are distinguished by good mechanical properties.

2 Claims, No Drawings

BLENDS OF POLYARYLENE SULFIDES, PHENOLIC RESIN NITROARYLATES, GLASS FIBERS AND OPTIONALLY OTHER FILLERS

This invention relates to blends of polyarylene sulfides, phenolic resin nitroarylates, glass fibers and optionally other fillers (additives). The blends according to the invention are distinguished by good mechanical properties.

Polyarylene sulfides (PAS) are known (cf. for example US-A 3,354,129, EP-A 171 021). They are inert, highly heat-resistant thermoplastics which can be filled to a high degree, for example with glass fibers and/or other inorganic fillers. The use of these polymers, particularly polyphenylene sulfide (PPS), is increasing in fields of application hitherto reserved for thermosets.

PAS has unsatisfactory mechanical properties for certain applications in the injection molding field. Above all, outer fiber strain and impact strength are inadequate for practical purposes. Accordingly, it has been found to be of advantage to improve the above-mentioned properties of PAS, for example by blending with other thermoplastics. In addition, it has been possible to improve the mechanical properties of PAS and blends of maleic-anhydride-grafted, hydrogenated diene rubbers and epoxides (JP-A 63-118 369). Although the large quantities of maleic-anhydride-grafted polyolefins having a low glass temperature used improve toughness, flexural strength cannot be significantly increased.

For certain applications, however, the property spectrum of such blends is not always entirely satisfactory.

It has now been found that blends of polyphenylene sulfide (PPS) with phenolic resin nitroarylates, glass fibers and, optionally, other additives are distinguished by their mechanical properties.

Accordingly, the present invention relates to blends of

A) 89.9 to 20% by weight polyarylene sulfides, preferably polyphenylene sulfide, B) 0.1 to 35% by weight and preferably 0.2 to 5% by weight phenolics, preferably novolaks, of which the OH groups may be completely or partly esterfied with 2-, 3- or 4-nitrobenzoic acid or 3,5-dinitrobenzoic acid or other acids corresponding to formula (I)

$$(O_2N)_n\text{—Ar—COOH} \quad (I),$$

in which $n = 1$, 2 or 3 and

Ar is an $(n+1)$-functional aromatic radical containing 6 to 14 carbon atoms,

C) 10 to 79.9% by weight and preferably 30 to 60% by weight glass fibers which are preferably sized with polyurethane film formers and aminosilane or epoxysilane coupling agents, more preferably with aminosilane coupling agents, and optionally up to 300% by weight, based on PAS, of other mineral or organic fillers and reinforcing materials and/or inorganic or organic auxiliaries.

Examples of phenolics are any of the compounds containing OH groups which are described in "Phenoplaste", Bachmann/Müller, VEB-Deutscher Verlag für Grundstoffindustrie, Leipzig 1973; phenol-formaldehyde condensates with an excess of phenol (novolaks) are preferred.

The reaction of the phenolics with the nitroaromatic carboxylic acids may be carried out by the Schotten-Baumann method as described in Organikum, VEB-Deutscher Verlag der Wissenschaft, Berlin 1973, 12th Edition, page 446, 0.5 to 1 mol of the nitroaromatic acid chloride being added for each equivalent of OH groups.

Novolaks are commercially available (for example Vulkadur RB ®, a product of Bayer AG).

Commercially available glass fibers preferably sized with polyurethane film formers and aminosilane or epoxysilane coupling agents are used in accordance with the invention. They have a diameter of 1 to 20 μm and preferably 5 to 13 μm. It is possible to use endless glass fibers and/or production methods in which the length of the fibers in the final blend is from 0.05 to 10 mm and preferably from 0.1 to 2 mm. Endless fibers (rovings) may also be used in processes for the production of unidirectional composites reinforced by endless fibers.

The glass fibers may even be replaced—more particularly partly—by commercially available glass beads, for example Ballotini glass beads.

Other suitable mineral fillers or additives are mica, talcum, silica flour, metal oxides and sulfides, for example $TiO_2$, ZnO, ZnS, graphite, carbon black, fibers, for example of quartz or carbon, carbonates, for example $MgCO_3$, $CaCO_3$, or sulfates, for example $CaSO_4$, $BaSO_4$.

Pigments, mold release agents, E waxes, flow aids, nucleating agents or stabilizers may be used as further typical additives. The fillers and additives may be used in quantities of 0 to 300% by weight, based on PAS.

The blends according to the invention may be produced in the usual way by extrusion.

The blends according to the invention may be processed by standard methods to moldings, semi-finished products, circuit boards, fibers, films, profiles, etc. The blends according to the invention may generally be used with advantage for applications where thermoplastically processible compounds are used.

EXAMPLES

The blends according to the invention are produced in a Werner & Pfleiderer ZSK 32 twin-screw extruder at 320° C.

The PPS used had a melt viscosity of 45 Pas (360° C.), shear stress = 1000 s$^{-1}$, and was produced in accordance with EP-A 171 021.

40% by weight CS 7916 ® chopped strands (Bayer AG) sized with polyurethane film former and aminosilane coupling agent were used as the glass fibers.

The blends were granulated and injection molded to test specimens (for example measuring 80×10×4 mm). The test specimens were used to determine flexural strength, outer fiber strain, modulus in bending and impact strength $a_n$ (reversed notched ISO 180).

COMPARISON EXAMPLE

60% by weight PPS were blended with 40% by weight glass fibers.

SYNTHESIS EXAMPLE

NOVOLAK ESTERIFIED WITH 3-NITROBENZOIC ACID 1 liter water and 60 g NaOH are added to 100 g Vulkadur RB ® and a solution of 200 g 3-nitrobenzoyl chloride in 300 ml THF is then added with stirring (cooling with ice). After 174 h, 500 ml $CH_2Cl_2$ are added and the organic phase is separated off and concentrated by evaporation. The N content of the product corresponds to the theoretical.

EXAMPLE 2

59% by weight PPS were blended with 40% by weight glass fibers and 1% by weight 4-nitrobenzoic acid ester of the novolak.

The mechanical properties are shown in the following Table:

| Example | Flexural strength (MPa) | Outer fiber strain (%) | Modulus in bending (MPa) | Izod notched impact strength (kJ/m$^2$) |
| --- | --- | --- | --- | --- |
| Comparison | 250 | 1.9 | 13,000 | 30 |
| 1 | 299 | 2.4 | 12,800 | 44 |

We claim:

1. Blends of
   A) 89.9 to 20% by weight polyarylene sulfides,
   B) 0.1 to 35% by weight phenolic resin, of which the OH groups are completely or partly esterified with 2-, 3- or 4-nitrobenzoic acid or 3,5-dinitrobenzoic acid or other acids corresponding to formula (I)

$$(O_2N)_n\text{—Ar—COOH} \qquad (I),$$

in which
   $n = 1$, 2 or 3 and
   Ar is an $(n+1)$-functional aromatic radical containing 6 to 14 carbon atoms,
   C) 10 to 79.9% by weight glass fibers which are optionally sized with polyurethane film formers and aminosilane or epoxysilane coupling agents,
   and optionally up to 300% by weight, based on the polyarylene sulfides, of other mineral or organic fillers and reinforcing materials and/or inorganic or organic auxiliaries.

2. A molded article comprising the blend as claimed in claim 1.

* * * * *